(12) United States Patent
Fitzgerald

(10) Patent No.: US 10,861,293 B2
(45) Date of Patent: Dec. 8, 2020

(54) PERSONAL EMERGENCY RESCUE BEACON DEVICE

(71) Applicant: Leonard Fitzgerald, Beverly, MA (US)

(72) Inventor: Leonard Fitzgerald, Beverly, MA (US)

( * ) Notice: Subject to any disclaimer, the term of this patent is extended or adjusted under 35 U.S.C. 154(b) by 0 days.

(21) Appl. No.: 16/285,349

(22) Filed: Feb. 26, 2019

(65) Prior Publication Data

US 2020/0152024 A1 May 14, 2020

Related U.S. Application Data

(63) Continuation-in-part of application No. 29/680,561, filed on Feb. 18, 2019.

(60) Provisional application No. 62/767,003, filed on Nov. 14, 2018.

(51) Int. Cl.
*G08B 5/00* (2006.01)
*G01S 19/17* (2010.01)
*B64B 1/40* (2006.01)
*B64B 1/58* (2006.01)

(52) U.S. Cl.
CPC ............... *G08B 5/002* (2013.01); *B64B 1/40* (2013.01); *B64B 1/58* (2013.01); *G01S 19/17* (2013.01)

(58) Field of Classification Search
CPC .. G08B 5/002; B64B 1/40; B64B 1/58; G01S 19/17
USPC .......................................................... 340/8.1
See application file for complete search history.

(56) References Cited

U.S. PATENT DOCUMENTS

| | | | | |
|---|---|---|---|---|
| 2,500,809 | A * | 3/1950 | Fennessy | H04B 1/034 455/96 |
| 5,262,768 | A * | 11/1993 | Florer | G08B 5/002 340/473 |
| 5,736,954 | A * | 4/1998 | Veazey | B63C 9/00 342/10 |
| 6,164,239 | A * | 12/2000 | Dawson | A62B 33/00 116/210 |
| 6,195,039 | B1 | 2/2001 | Glass, Jr. | |
| 6,222,484 | B1 | 4/2001 | Seiple et al. | |
| 6,332,424 | B1 * | 12/2001 | Frink | B63C 11/26 116/210 |
| 9,522,717 | B2 | 12/2016 | Jones | |
| 9,619,977 | B2 | 4/2017 | Graham et al. | |
| 9,749,830 | B2 * | 8/2017 | Meredith | H04W 4/025 |
| 2004/0142613 | A1 * | 7/2004 | Barden | B63C 9/155 441/6 |

(Continued)

*Primary Examiner* — Kam Wan Ma
(74) *Attorney, Agent, or Firm* — Boudwin Intellectual Property; Daniel Boudwin

(57) ABSTRACT

A personal emergency rescue beacon device. The device includes a balloon operably connected to a helium supply tank which is disposed within a waterproof housing. The waterproof housing is securable to a user's clothing via a clip fastener, or alternatively may be kept in a user's bag. A control operably connected to the helium supply tank is configured to automatically inflate and release the balloon when activated. The balloon includes a light source thereon that is configured to flash in a desired pattern for increased visibility. The balloon is affixed to a tether having a retraction mechanism that can be used automatically retract the balloon when actuated. The control is further operably connected to a GPS module that is configured to determine and transmit a location of the housing via a wireless transceiver to an emergency services department or other remote locations.

20 Claims, 3 Drawing Sheets

(56) References Cited

U.S. PATENT DOCUMENTS

| | | | |
|---|---|---|---|
| 2006/0196499 A1* | 9/2006 | Cannizzaro | B63C 11/26 128/200.14 |
| 2009/0094867 A1* | 4/2009 | Darnell, II | G08B 5/002 40/212 |
| 2013/0291787 A1 | 11/2013 | Broussard, Jr. | |
| 2016/0229512 A1* | 8/2016 | Hall | G08B 5/002 |
| 2017/0156044 A1* | 6/2017 | Meredith | H04W 4/025 |

* cited by examiner

PERSONAL EMERGENCY RESCUE BEACON DEVICE

CROSS REFERENCE TO RELATED APPLICATIONS

This application claims the benefit of U.S. Provisional Application No. 62/767,003 filed on Nov. 14, 2018 and the benefit of U.S. Design Application No. 29/680,561 filed on Feb. 18, 2019. The above identified patent application is herein incorporated by reference in its entirety to provide continuity of disclosure.

BACKGROUND OF THE INVENTION

The present invention relates to wireless emergency alert and rescue systems. More specifically, the present invention relates to a personal emergency rescue beacon system having a wireless transceiver and an attached inflatable helium balloon.

Outdoor enthusiasts or other individuals may end up getting lost in the wilderness or other remote or inhospitable areas. While emergency rescue personnel may be deployed after a short period of time after the accident, pinpointing the exact location of lost persons or parties may be extremely hard if not impossible in certain cases. Without flares, fires, or the like, lost individuals may be unable to signal emergency rescue personnel. Delays in searching for a lost individual or party can lead to the individual or party suffering from dehydration, starvation, or even death. Accordingly, a device that is configured to transmit a location thereof to emergency services for easily identifying a lost individual or party is desired.

Devices have been disclosed in the art that relate to wireless emergency alert and rescue systems. These include devices that have been patented and published in patent application and publications. These devices generally relate to personal emergency signaling systems that employ GPS receiver and processing systems to alert rescue personnel. These devices, however, have several known drawbacks. For example, the devices in the art fail to provide a personal emergency rescue beacon device that includes a tether that is affixed to a retraction mechanism disposed within the housing that can be used to automatically retract the balloon when needed.

In light of the devices in the known art, it is submitted that the present invention substantially diverges in design elements from the known art and consequently it is clear that there is a need in the art for an improvement to existing personal emergency rescue systems. In this regard, the instant invention substantially fulfills these needs.

SUMMARY OF THE INVENTION

In view of the foregoing disadvantages inherent in the known types of wireless emergency alert and rescue systems now present in the known art, the present invention provides a personal emergency rescue beacon device wherein the same can be utilized for providing convenience for the user when lost and in need of rescue in a remote or not easily reached location.

It is therefore an object of the present invention to provide a new and improve personal emergency beacon device that has all of the advantages of the devices in the art and none of the disadvantages.

It is another object of the present invention to provide a personal emergency beacon device that includes waterproof housing having a resealable opening thereon, defining an interior volume. A gas storage and supply cannister having an inflatable bladder attached and in gaseous communication thereto is disposed within the interior volume of the housing. An extended tether is attached to the inflatable bladder on one end and a retraction system affixed within the housing on a second end. A control operably connected to a power source automatically fills the inflatable bladder when actuates while also powering a global positioning satellite (GPS) module and transmitter affixed to the inflatable bladder.

Another object of the present invention is to provide a personal emergency rescue beacon device wherein the gaseous storage and supply cannister is configured to hold buoyant, lighter-than-air gases such as helium to allow the inflatable bladder to overcome gravity and float upwards when inflated.

Yet another object of the present invention is to provide a personal emergency rescue beacon device wherein the global positioning satellite (GPS) module affixed to the inflatable bladder includes a transmitter configured to emit signals on all emergency frequencies to facilitate rescue.

Another object of the present invention is to provide a personal emergency rescue beacon device wherein a light source, such as a light-emitting diode (LED) bulb, is affixed to the bladder and operably connected to the control is configured to illuminate in a series of flashes corresponding to a distress signal.

A further object of the present invention is to provide a personal emergency rescue beacon device wherein fasteners disposed on the outer surface of the housing are configured to removably affix the device to a user.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
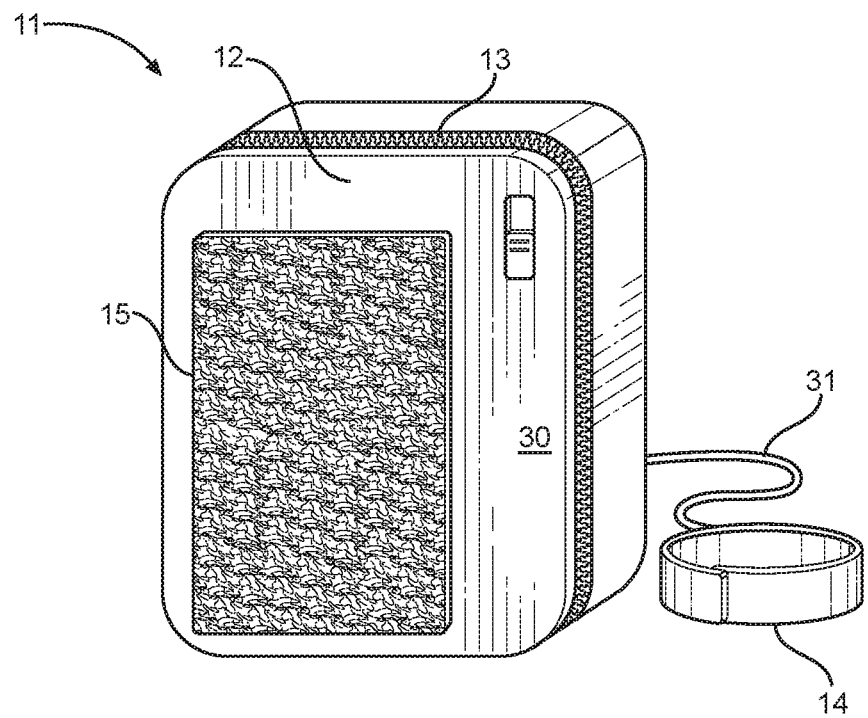
FIG. 1 shows a perspective view of an embodiment of the personal rescue beacon device showing the exterior surface and overall structure of the housing.

Reference is made herein to the attached drawings. Like reference numerals are used throughout the drawings to depict like or similar elements of the personal rescue beacon device. For the purposes of presenting a brief and clear description of the present invention, the preferred embodiment will be discussed as used for an emergency rescue device that utilizes an inflatable bladder to allow a global positioning satellite (GPS) module to get to higher ground for transmitting emergency signals. The figures are intended for representative purposes only and should not be considered to be limiting in any respect.

Referring now to FIG. 1, there is shown a perspective view of an embodiment of the personal rescue beacon device showing the exterior surface and overall structure of the housing. The person rescue beacon device 11 comprises an enclosed housing 12 having an interior volume therein. In the illustrated embodiment, the housing 12 is composed of waterproof materials and includes a watertight construction by having a resealable opening 13 disposed thereon, wherein the interior may be selectively accessed by a user when desired and or sealed to waterproof the interior. The resealable opening 13 may be made of any suitable construction that would allow it to retain its waterproof qualities, such as zip lock fasteners or interlocking seals, for example.

A fastener 15 is disposed on the exterior surface 30 of the personal rescue beacon device 11 to allow for a user to removably attach the device 11 to the user's person or clothing. In other embodiments, a plurality of fasteners may be disposed on the exterior surface 30 of the housing 12 to removably attach the housing 12 to a user. These fasteners allow a user to ensure that the personal rescue beacon device 11 may be close at hand while being used during leisure and outdoor activities wherein one may become lost and in need of a means to signal for help. In the illustrated embodiment, the personal rescue beacon 11 includes an elongated strap 31 having a first end affixed to the exterior surface 30 of the personal rescue beacon device 11 and a second end affixed to an adjustable wristband 14 which is adapted to receive the hand of a user therethrough in order to tether the device to the user. In some embodiments, a plurality of fasteners 15 may also be disposed on the exterior surface 30 of the housing 12 to allow for a user to attach the device 11 to a piece of apparel or gear within easy reach of the user. These fasteners allow for the personal emergency beacon device 11 to be secured in a readily available position instead of within a pocket, bag, or vehicle, which may not always be accessible or convenient when needed.

Figure 2:
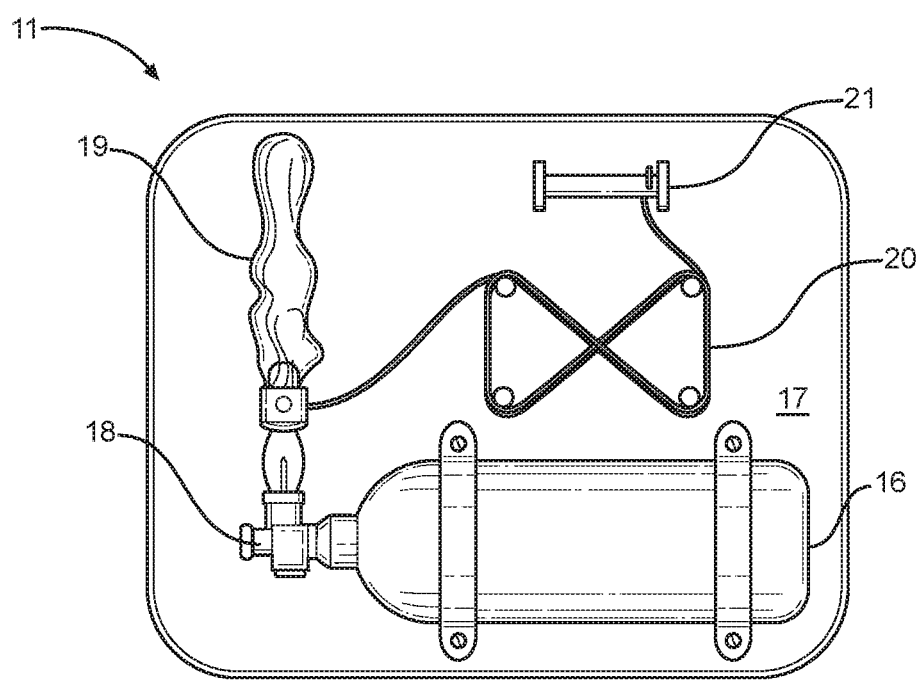
FIG. 2 shows a top plan view of an embodiment of the personal rescue beacon device components within the internal volume of the housing.

Referring now to FIG. 2, there is shown a top plan view of an embodiment of the personal rescue beacon device components within the interior volume of the housing. A gas storage and supply cannister 16 is contained within the interior volume of the housing 12 and affixed to the interior surface 17. In one embodiment, the gas storage and supply container 16 is removably securable within the interior volume via one or more fasteners. The gas storage and supply container 16 is configured to hold buoyant, lighter-than-air gases such as helium. A nozzle 18 is located on an end of the cannister wherein an inflatable bladder 19 connected in gaseous communication with the cannister 16. In the illustrated embodiment, the inflatable bladder 19 is composed of a thin layer of rubber having a durable and elastic construction allowing for the bladder 19 to expand when filled with a volume of gas. An extended length tether 20 is included within the interior volume of the housing 12 wherein a first end of the tether 20 is affixed to the inflatable bladder 19 while a second end of the tether 20 is connected to a retraction mechanism 21 also disposed within the interior volume of the personal emergency beacon device 11. In the illustrated embodiment, the retraction mechanism 21 comprises an automatic spool device but in other embodiments of the personal emergency beacon device 11 the retraction mechanism 21 may be manual or of any suitable construction to assist a user is retracting the inflatable bladder 19. The tether 20 may be made of any length desired by the user but should be of a sufficient length to allow for the inflatable bladder to get above typical forest canopy height. A tether 20 having a length of between 150 and 350 feet may be desirable but could change depending on the nature of the use contemplated for the device 11.

Figure 3:
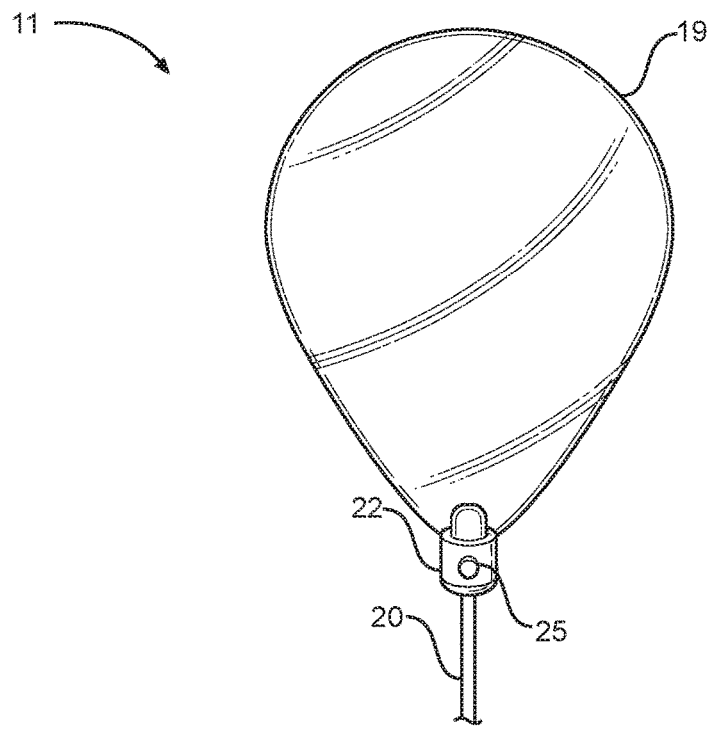
FIG. 3 shows a perspective view of an embodiment of the personal rescue beacon device showing with inflatable bladder in an inflated disposition.
Figure 4:
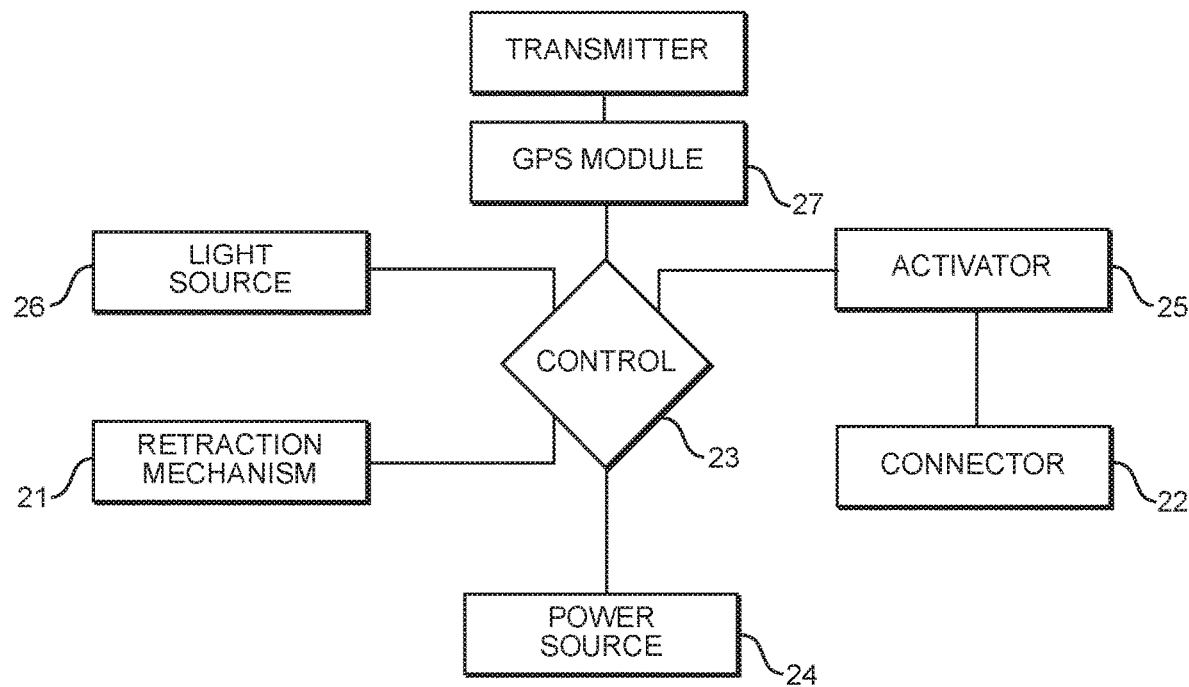
FIG. 4 shows a schematic diagram of the electronic components of the personal rescue beacon device.

Referring now to FIG. 3 and FIG. 4, there is shown a perspective view of an embodiment of the personal rescue beacon device with inflatable bladder in an inflated disposition and a schematic diagram of the electronic components of the personal rescue beacon device, respectively. The inflatable bladder 19 comprises a unitary piece of elastic material having a single opening with a neck defined by a narrow channel leading into a larger interior reservoir. A connector 22 is affixed to a bottom portion of the inflatable bladder 19 on the neck where the inflatable bladder 19 comes into gaseous communication with the nozzle portion of the gas storage and supply cannister. A control 23 is included within the connector 22 piece. The control 23 is operably attached to a power source 24 and includes an actuator 25 on an exterior surface of the connector 22 piece. When the actuator 25 has been operated by a user, the control 23 releases an amount of gas through the nozzle of the gas storage and supply cannister into the inflatable bladder 19 via the connector 22 piece and channel. When inflated to an appropriate level, the bladder 19 will become buoyant and float in an upward direction. The length of tether 20 within the interior volume of the housing 12 allows the inflatable bladder 19 to float skyward while still being firmly affixed to the personal emergency beacon device 11 and within the control of the user.

Figure 5:
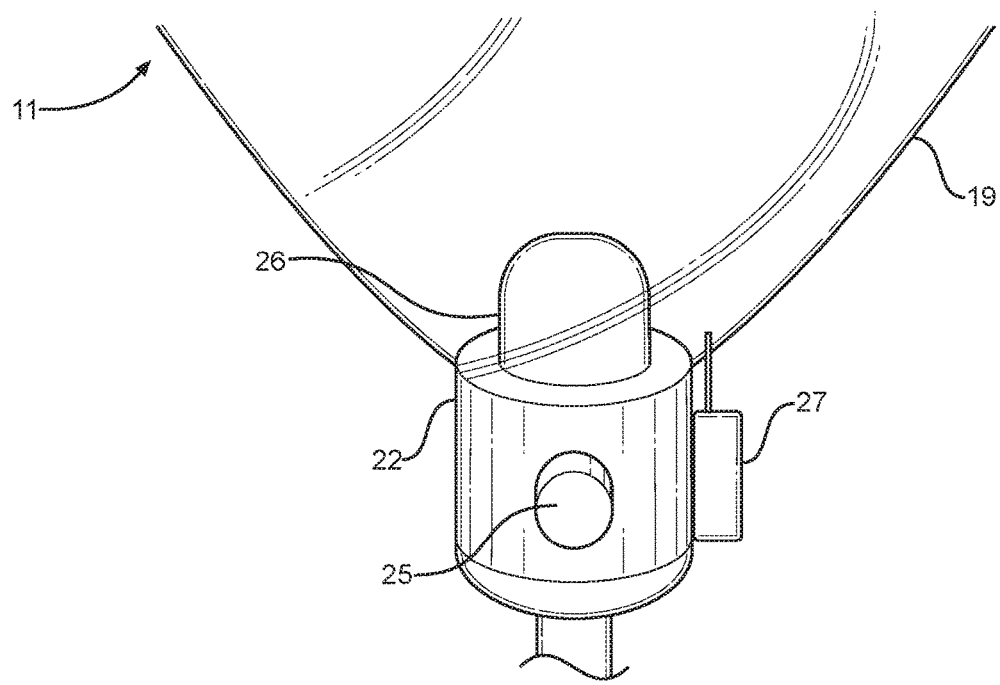
FIG. 5 shows a perspective view of an embodiment of the personal rescue beacon device showing the affixed components of the inflatable bladder.

Referring now to FIG. 5, there is shown a perspective view of the personal rescue beacon device showing the affixed components of the inflatable housing. A light source 26 is affixed to the inflatable bladder 19 and operably connected to the control and power source. The light source 26 is configured to illuminate when the actuator 25 has been operated by a user. The light source 26 may include high intensity light-emitting diode (LED) bulbs or any other suitable source of illumination. In some embodiments of the personal emergency beacon device 11, the light source 26 is disposed on the connector 22 piece and may be programmed to illuminate in patterns corresponding to distress signals in Morse code to potentially alert nearby aircraft, rescue personnel, or passersby. A global positioning satellite (GPS) module 27 is also affixed to the inflatable bladder 19 and operably connected to the control and power source. When actuated, the GPS module 27 is configured to transmit the location coordinates of the user on all emergency frequencies to alert rescue personnel. In some embodiments, a plurality of reflective strips are also disposed on the outer surface of the housing and adapted to reflect the sunlight and other sources of light in order to signal ships, planes, and rescue personnel.

Figure 6:
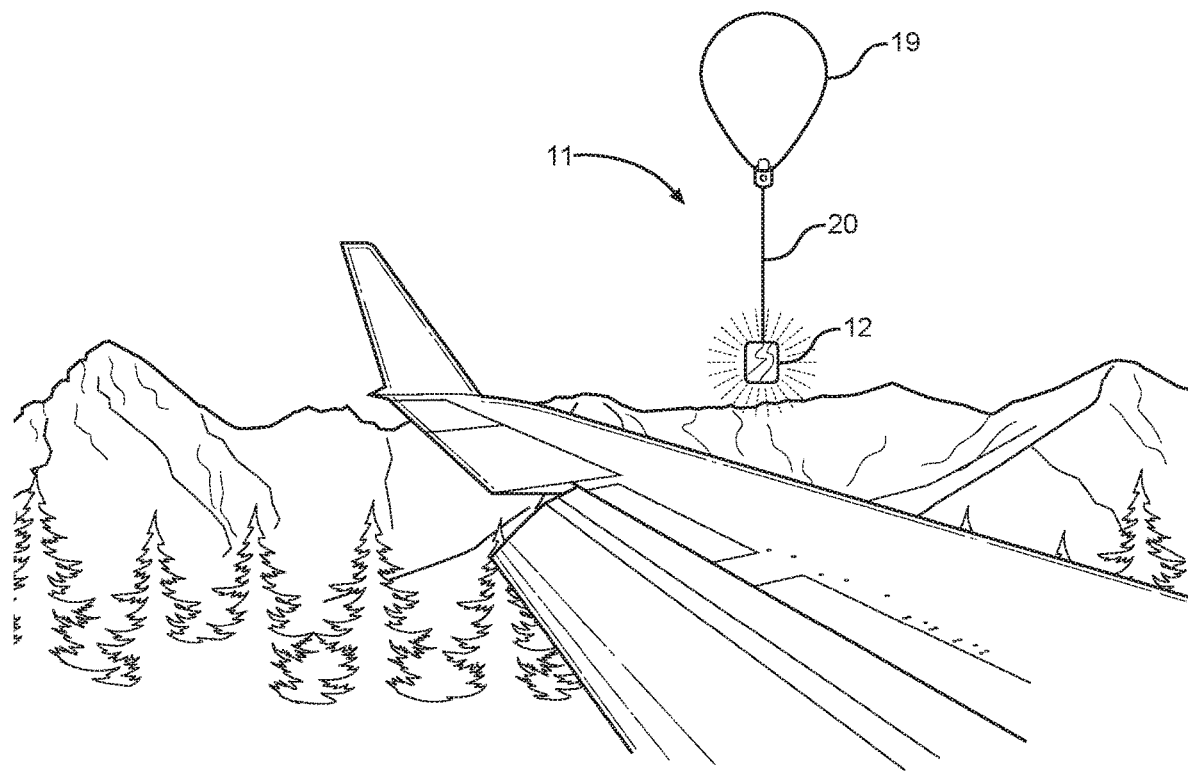
FIG. 6 shows a perspective view of an embodiment of the personal rescue beacon device in use.

Referring now to FIG. 6, there is shown a perspective view of the personal rescue beacon device in use. In practice, the personal emergency beacon device 11 will only be necessary in situations where a user becomes lost or disoriented in unfamiliar country and is in need of help from rescue personnel. Another situation where the personal rescue beacon device 11 would be necessary are instances of the user becoming injured or otherwise incapacitated and unable to return to safety to seek help. In such circumstances, a user may turn to the device 11 which would be close at hand. The device is accessed using the resealable opening disposed on the surface of the waterproof housing 12 to expose the interior volume. A user may then actuate the device which automatically inflates the inflatable bladder 19. After inflation, the inflatable bladder 19 separates from the gas storage and supply cannister by disengaging the connector piece from the nozzle of the cannister. The inflatable bladder 19, affixed to the housing 12 via the tether 20, may then rise to determine the exact coordinates while also transmitting the distress signals and illuminating the light source for added visibility and conspicuity. The inflatable bladder 19 may be retracted when finished or no longer needed using the retraction mechanism attached to the second end of the tether 20.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A personal emergency rescue beacon device, comprising:
    a housing having a resealable opening thereon and defining an interior volume therein;
    a gas storage and supply canister disposed within the housing;
    an inflatable bladder attached to and in gaseous communication with the gas storage and supply canister via a connector;
    wherein a neck of the inflatable bladder is affixed to an upper side of the connector, such that gas released from the gas storage and supply canister passes through the connector into the inflatable bladder;
    an extended tether having a first end affixed to a lower end of the connector and a second end attached to a retraction mechanism which is affixed within the interior volume of the housing;
    wherein the retraction mechanism comprises an automatic spool device configured to selectively move the tether between an extended position and a retracted position, wherein the retracted position, the tether is wound about the automatic spool device;
    a control disposed within the connector and operably connected to a power source, wherein the control is configured to automatically fill the inflatable bladder with the gas from the storage and supply canister when an actuator disposed on the connector is actuated;
    wherein the gas storage and supply canister remains within the interior volume of the housing when the tether is in the extended position; and
    a global satellite positioning (GPS) module operably connected to the control and affixed to the connector, wherein the GPS module is configured to determine the geographic location of the housing.

2. The personal emergency rescue beacon device of claim 1, wherein the housing is constructed of a waterproof material such that a watertight seal is formed when the resealable opening is in a closed position.

3. The personal emergency rescue beacon device of claim 1, wherein the gas supply and storage canister is configured to hold buoyant gases that are lighter-than-air.

4. The personal emergency rescue beacon device of claim 1, wherein the inflatable bladder is composed of a flexible and stretchable material which allows for the bladder to inflate to accommodate a volume of gas sufficient to allow the bladder to overcome gravity and float in an upward trajectory.

5. The personal emergency rescue beacon device of claim 1, wherein the inflatable bladder is a balloon comprising a thin layer of elastic rubber material.

6. The personal emergency rescue beacon device of claim 1, wherein the tether affixed to the inflatable bladder and retraction mechanism includes a length between 150 feet and 350 feet.

7. The personal emergency rescue beacon device of claim 1, wherein the global positioning satellite (GPS) module includes a long-range transmitter that is operably connected to the control and affixed to the inflatable bladder.

8. The personal emergency rescue beacon device of claim 7, wherein the global positioning satellite (GPS) module is configured to transmit a signal location on one or more emergency frequencies when activated.

9. The personal emergency rescue beacon device of claim 1, wherein a light source is disposed on an upper side of the connector and operably connected to the control, wherein the neck of the inflatable bladder extends about the light source, such that the light source is disposed within and affixed to the inflatable bladder.

10. The personal emergency rescue beacon device of claim 9, wherein the light source is programmed to flash in a sequence corresponding to SOS in Morse Code.

11. The personal emergency rescue beacon device of claim 9, wherein the light comprises of one or more high intensity light-emitting diode (LED) bulbs.

12. The personal emergency rescue beacon device of claim 1, wherein a reflective material is affixed to an outer surface of the inflatable bladder.

13. The personal emergency rescue beacon device of claim 1, wherein the power source operably connected to the control comprises a battery.

14. The personal emergency rescue beacon device of claim 1, wherein a strap is included having a first end affixed to an outer surface of the housing and a second end affixed to a band adapted to be worn around the wrist of the user.

15. The personal emergency rescue beacon device of claim 1, wherein fasteners disposed on the outer surface of the housing are adapted to removably affix the device to an article of clothing of a user.

16. The personal emergency rescue beacon device of claim 15, wherein the fasteners disposed on the outer surface of the housing comprise a plurality of hook and loop fasteners.

17. The personal emergency rescue beacon device of claim 15, wherein the fasteners disposed on the outer surface of the housing comprise a plurality of clip fasteners.

18. The personal emergency rescue beacon device of claim 1, wherein the resealable opening disposed on the housing comprises a zipper assembly.

19. The personal emergency rescue beacon device of claim 1, wherein a plurality of reflective strips are disposed on the outer surface of the housing.

20. The personal emergency rescue beacon device of claim 1, further comprising a plurality of pegs affixed to an interior surface of the housing, wherein the tether winds between each of the plurality of pegs between the spool and the inflatable bladder.

\* \* \* \* \*